(12) United States Patent
Hachisuka et al.

(10) Patent No.: US 10,981,427 B2
(45) Date of Patent: Apr. 20, 2021

(54) DAMPING CONTROL DEVICE, DAMPING CONTROL METHOD, AND MOVING BODY

(71) Applicant: SONY CORPORATION, Tokyo (JP)

(72) Inventors: Takumi Hachisuka, Tokyo (JP); Hiroshi Uji, Tokyo (JP); Kenichi Matsuhisa, Chiba (JP); Kazuma Yoshi, Tokyo (JP); Sho Tanaka, Tokyo (JP)

(73) Assignee: SONY CORPORATION, Tokyo (JP)

( * ) Notice: Subject to any disclaimer, the term of this patent is extended or adjusted under 35 U.S.C. 154(b) by 89 days.

(21) Appl. No.: 16/070,034

(22) PCT Filed: Feb. 14, 2017

(86) PCT No.: PCT/JP2017/005252
§ 371 (c)(1),
(2) Date: Jul. 13, 2018

(87) PCT Pub. No.: WO2017/169203
PCT Pub. Date: Oct. 5, 2017

(65) Prior Publication Data
US 2019/0016188 A1    Jan. 17, 2019

(30) Foreign Application Priority Data

Mar. 29, 2016  (JP) .............................. JP2016-065650

(51) Int. Cl.
*B60G 17/018*    (2006.01)
*B60G 17/016*    (2006.01)
(Continued)

(52) U.S. Cl.
CPC ....... *B60G 17/016* (2013.01); *B60G 17/0164* (2013.01); *B60G 17/0165* (2013.01);
(Continued)

(58) Field of Classification Search
CPC .. B60G 17/0165; B60G 17/016; B60G 17/06; B60G 17/0195; B60G 17/0164;
(Continued)

(56) References Cited

U.S. PATENT DOCUMENTS 4,827,416 A * 5/1989 Kawagoe ............. B60G 17/016
280/5.512
6,622,074 B1 * 9/2003 Coelingh .............. B60T 8/1755
180/165

(Continued)

FOREIGN PATENT DOCUMENTS

JP    2004-299569 A    10/2004
JP    2012-88622 A    5/2012
(Continued)

OTHER PUBLICATIONS

Office Action for JP Patent Application No. 2018-508535, dated Jun. 25, 2018, 09 pages of Office Action and 12 pages of English Translation.
(Continued)

*Primary Examiner* — Toan C To
(74) *Attorney, Agent, or Firm* — Chip Law Group

(57) ABSTRACT

A damping control device and a damping control method for controlling damping of a vehicle are provided. Damping control of the vehicle is performed by adaptively switching a damping mode while considering energy consumption (fuel economy, a consumption amount of a battery, and the like) according to a state of the vehicle such as a state of an interior of the vehicle, a driving state of the vehicle, and an ambient environment. That is, the state of an interior of the vehicle, the driving state of the vehicle, and the ambient environment are constantly monitored, and the damping mode is switched to a weak damping mode in the case where unnecessity of damping as strong as a current state is determined whereas the damping mode is switched to a
(Continued)

strong damping mode in the case where necessity of stronger damping is determined.

18 Claims, 6 Drawing Sheets

(51) Int. Cl.
  *B60G 17/0195* (2006.01)
  *B60G 17/06* (2006.01)
  *B60G 17/0165* (2006.01)
(52) U.S. Cl.
  CPC ......... *B60G 17/0195* (2013.01); *B60G 17/06* (2013.01); *B60G 2500/10* (2013.01); *B60G 2600/0422* (2013.01); *B60G 2600/202* (2013.01); *B60G 2600/71* (2013.01)
(58) Field of Classification Search
  CPC .......... B60G 2500/10; B60G 2600/202; B60G 2600/71; B60G 2600/042
  USPC .......................................................... 701/37
  See application file for complete search history.

(56) References Cited

U.S. PATENT DOCUMENTS

| | | | | |
|---|---|---|---|---|
| 7,212,896 B2* | 5/2007 | Coelingh | ............. | B60W 30/18 701/48 |
| 7,480,547 B2* | 1/2009 | Brown | ................. | B60W 30/04 280/5.5 |
| 7,706,942 B2* | 4/2010 | Miyajima | ............ | B60G 17/019 280/5.507 |
| 8,280,587 B2* | 10/2012 | Abele | ..................... | B60T 8/172 701/31.4 |
| 8,285,447 B2* | 10/2012 | Bennett | ............ | B60G 17/01908 701/37 |
| 9,205,717 B2* | 12/2015 | Brady | .................... | B60G 17/06 |
| 9,533,539 B2* | 1/2017 | Eng | ...................... | B60G 17/019 |
| 2008/0156602 A1* | 7/2008 | Hiemenz | ................ | B60N 2/508 188/267.1 |
| 2013/0184935 A1* | 7/2013 | Muragishi | ............ | B60G 17/018 701/37 |
| 2019/0241038 A1* | 8/2019 | Katsuyama | .......... | B60G 17/018 |

FOREIGN PATENT DOCUMENTS

| | | | |
|---|---|---|---|
| JP | 2012-088622 A | | 5/2012 |
| JP | 2013-189064 A | | 9/2013 |
| JP | 2015-024746 A | | 2/2015 |
| JP | 2016-007978 A | | 1/2016 |

OTHER PUBLICATIONS

International Search Report and Written Opinion of PCT Application No. PCT/JP2017/005252, dated Mar. 21, 2017, 07 pages of ISRWO.

Office Action for JP Patent Application No. 2018-508535 dated Jan. 19, 2021, 04 pages of Office Action and 04 pages of English Translation.

* cited by examiner

US 10,981,427 B2

DAMPING CONTROL DEVICE, DAMPING CONTROL METHOD, AND MOVING BODY

CROSS REFERENCE TO RELATED APPLICATIONS

This application is a U.S. National Phase of International Patent Application No. PCT/JP2017/005252 filed on Feb. 14, 2017, which claims priority benefit of Japanese Patent Application No. JP 2016-065650 filed in the Japan Patent Office on Mar. 29, 2016. Each of the above-referenced applications is hereby incorporated herein by reference in its entirety.

TECHNICAL FIELD

The technology disclosed in the present specification relates to a damping control device for controlling damping of a moving body such as a vehicle, a damping control method, and the moving body.

BACKGROUND ART

Study regarding automatic driving of vehicles has been rapidly in progress (see, for example, Patent Document 1). Emergence of fully automatically driven vehicles on the public road is expected in the near future with further advancement of advanced driver assistance system (ADAS) in the future, improvement of social infrastructure such as introduction of dedicated driving lanes and lane sections where drivers do not need intervention, and further, for example, relaxation of laws and regulations allowing drivers to be disconnected from vehicle control, and the like.

For a passenger of a vehicle completely disconnected from vehicle control, a vehicle interior becomes a space for food, clothing and housing like a living room at home. That is, in the vehicle interior, various activities are supposed to be performed in the vehicle interior, such as not only to relax, sleep, read and talk with each other but also to watch content such as movies and TV programs, play games, eat and have a party. Therefore, the vehicle interior should be a comfortable space that is comfortable to ride (or is an unnoticeable ride to the passenger) so as not to get in the way of these activities.

Technologies for improving a comfortable ride of vehicles have been researched and developed for a long time. For example, a vehicle damping technology for damping vibrations in a pitch direction of a vehicle body, and the like, is known (for example, see Patent Document 2). Further, a vehicle control device for stably improving a comfortable ride of a rear seat occupant has been proposed by determining control amounts for suppressing vibrations in the resonance frequency band of the human body with respect to each of the vibration directions to be suppressed according to the seated posture of the rear seat occupant (see Patent Document 3, for example).

CITATION LIST

Patent Document

Patent Document 1: Japanese Patent Application Laid-Open No. 2015-24746
Patent Document 2: Japanese Patent Application Laid-Open No. 2016-7978
Patent Document 3: Japanese Patent Application Laid-Open No. 2013-189064

SUMMARY OF THE INVENTION

Problems to be Solved by the Invention

An object of the technology disclosed in the present specification is to provide a damping control device for controlling damping of a moving body such as a vehicle, a damping control method, and the moving body.

Solutions to Problems

A technology disclosed in the present specification has been made in consideration of the above problem, and a first aspect of the technology is a damping control device including:

a damping mechanism unit configured to damp a moving body by any of a plurality of damping modes having different degrees of suppressing vibration; and a control unit configured to control the damping mode in the damping mechanism unit according to a state of the moving body.

According to a second aspect of the technology disclosed in the present specification, in the damping control device according to the first aspect, the plurality of different damping modes is configured to have different areas from one another in which the vibration of the moving body is damped.

According to a third aspect of the technology disclosed in the present specification, the damping control device according to the first aspect further includes a detection unit configured to detect the state of the moving body including a state of a passenger. Then, the control unit is configured to control switching of the damping mode according to the state of a passenger detected by the detection unit.

According to a fourth aspect of the technology disclosed in the present specification, the control unit of the damping control device according to the third aspect is configured to switch the damping mode to a damping mode of more strongly suppressing vibration in response to detection of existence of food or drink in the moving body by the detection unit.

According to a fifth aspect of the technology disclosed in the present specification, the control unit of the damping control device according to the third aspect is configured to switch the damping mode to a damping mode of more strongly suppressing vibration in response to detection of a decrease in comfortability of the passenger by the detection unit.

According to a sixth aspect of the technology disclosed in the present specification, the damping control device according to the first aspect further includes a detection unit configured to detect the state of the moving body including a state of an object installed in the moving body. Then, the control unit is configured to control switching of the damping mode according to the state of the object detected by the detection unit.

According to a seventh aspect of the technology disclosed in the present specification, the control unit of the damping control device according to the sixth aspect is configured to control switching of the damping mode according to a place where the object detected by the detection unit is placed.

According to an eighth aspect of the technology disclosed in the present specification, the control unit of the damping control device according to the sixth aspect is configured to switch the damping mode to a damping mode of more strongly suppressing vibration in response to detection of placement of an object on a predetermined object installed in the moving body by the detection unit.

According to a ninth aspect of the technology disclosed in the present specification, the control unit of the damping control device according to the first aspect is configured to control switching of the damping mode according to an operation state of a device installed in the moving body.

According to a tenth aspect of the technology disclosed in the present specification, the damping control device according to the first aspect further includes a detection unit configured to detect a driving state of the moving body. Then, the control unit is configured to control switching of the damping mode according to the driving state detected by the detection unit.

According to an eleventh aspect of the technology disclosed in the present specification, the damping control device according to the first aspect further includes a detection unit configured to detect an ambient environment of the moving body. Then, the control unit is configured to control switching of the damping mode according to the ambient environment detected by the detection unit According to a twelfth aspect of the technology disclosed in the present specification, the control unit of the damping control device according to the first aspect is configured to prompt a user to select whether or not to switch the damping mode.

According to a thirteenth aspect of the technology disclosed in the present specification, in the damping control device according to the first aspect, the damping mode includes at least one of a mode of causing the moving body to have a slow speed and a mode of stopping the moving body.

According to a fourteenth aspect of the technology disclosed in the present specification, the damping control device according to the first aspect includes a mode of selecting a route in which the moving body moves, as the damping mode.

According to a fifteenth aspect of the technology disclosed in the present specification, the damping control device according to the first aspect includes a mode of not performing damping as the damping mode.

According to a sixteenth aspect of the technology disclosed in the present specification, the damping control device according to the first aspect is configured to have different energy consumption in each of the damping modes.

Further, a seventeenth aspect of the technology disclosed in the present specification is a damping control method including:

a damping step of damping a moving body by any of a plurality of damping modes having different degrees of suppressing vibration; and a control step of controlling the damping mode in the damping step according to a state of the moving body.

Further, an eighteenth aspect of the technology disclosed in the present specification is a moving body including:

a drive unit configured to drive the moving body;

a damping mechanism unit configured to damp the moving body by any of a plurality of damping modes having different degrees of suppressing vibration based on the driving by the drive unit; and a control unit configured to control the damping mode in the damping mechanism unit according to a state of the moving body.

Effects of the Invention

According to the technology disclosed in the present specification, a damping control device for controlling damping of a moving body such as a vehicle, a damping control method, and the moving body can be provided.

Note that the effects described in the present specification are merely examples, and the effects of the present invention are not limited thereto. Further, the present invention may further exhibit additional effects in addition to the above effects.

Still other objects, features, and advantages of the technology disclosed in the present specification will become clear from detailed description based on embodiments described below and attached drawings.

MODE FOR CARRYING OUT THE INVENTION

Hereinafter, embodiments of the technology disclosed in the present specification will be described in detail with reference to the drawings.

A. System Configuration

Figure 1:
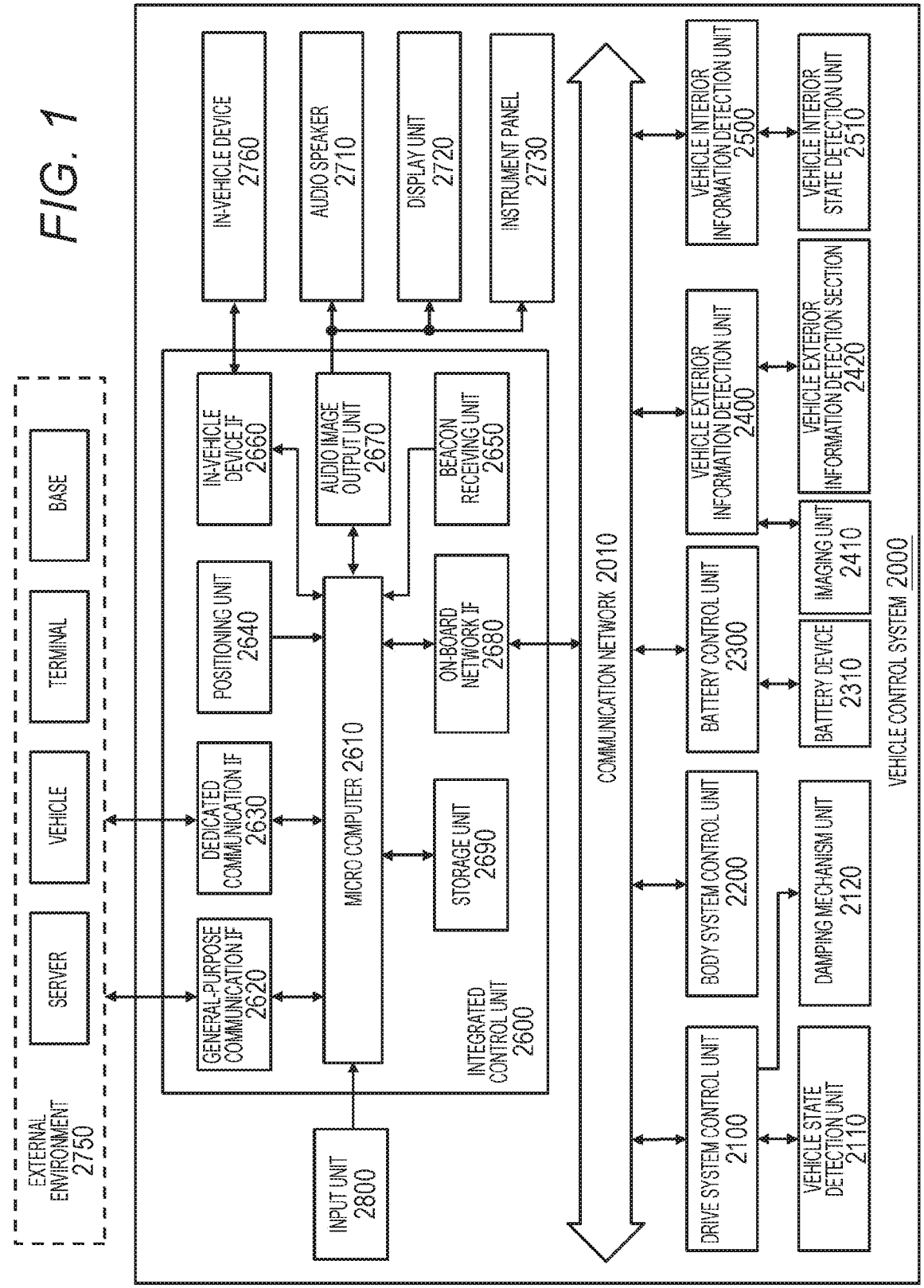
FIG. 1 is a diagram schematically illustrating a configuration example of a vehicle control system 2000 to which the technology disclosed in the present specification is applicable.

FIG. 1 schematically illustrates a configuration example of a vehicle control system 2000 to which the technology disclosed in the present specification is applicable. The illustrated vehicle control system 2000 includes a plurality of control units such as a drive system control unit 2100, a body system control unit 2200, a battery control unit 2300, a vehicle exterior information detection unit 2400, a vehicle interior information detection unit 2500, and an integrated control unit 2600.

The control units 2100 to 2600 are connected to one another via a communication network 2010. The communication network 2010 is, for example, an on-board communication network conforming to an arbitrary communication standard such as a controller area network (CAN), a local interconnect network (LIN), a local area network (LAN)), or FlexRay (registered trademark), or a network conforming to a locally defined communication standard.

Each of the control units 2100 to 2600 includes, for example, a micro computer that performs arithmetic processing according to various programs, a storage unit that stores programs executed by the micro computer, parameters used for various calculations, or the like, and a drive circuit that drives various devices to be controlled. Further, each of the control units 2100 to 2600 has a network interface (IF) for performing communication with another control unit via the communication network 2010, and a communication interface for performing communication with a device, a sensor, or the like inside or outside the vehicle by means of wired communication or wireless communication.

The drive system control unit 2100 controls an operation of a device regarding a drive system of a vehicle according to various programs. For example, the drive system control unit 2100 functions as a drive force generation device for generating drive force of the vehicle, such as an internal combustion engine and a drive motor, a drive force transmission mechanism for transmitting the drive force to wheels, a steering mechanism for adjusting a steering angle of the vehicle, and a control device such as a brake device for generating braking force of the vehicle. Further, the drive system control unit 2100 may have a function as a control device of an antilock brake system (ABS), electronic stability control (ESC), damping control of the vehicle, or the like. A vehicle state detection unit 2110 and a damping mechanism unit 2120 are connected to the drive system control unit 2100.

The vehicle state detection unit 2110 includes, for example, a gyro sensor for detecting angular velocity of an axial rotational motion of a vehicle body, an acceleration sensor for detecting acceleration of the vehicle, or at least one of sensors for detecting an operation amount of an accelerator pedal, an operation amount of a brake pedal, a steering angle of a steering wheel, an engine speed, a rotation speed of a wheel, and the like. The drive system control unit 2100 performs arithmetic processing using a signal input from the vehicle state detection unit 2110 and controls the internal combustion engine, the drive motor, the electric power steering device, the brake device, and the like (none of them are illustrated).

The damping mechanism unit 2120 damps vibrations in a pitch direction of the vehicle body, and the like, for example, by providing a shock absorber in parallel with a spring in a suspension and attenuating a relative motion of upper and lower ends of the spring with the shock absorber. Note that, in the technology disclosed in the present specification, the structure of the damping mechanism itself is arbitrary. Needless to say, the damping mechanism unit 2120 may damp not only the vibration in the pitch direction of the vehicle body but also vibrations in a roll direction and a yaw direction. Further, the damping mechanism unit 2120 may isolate a vehicle interior (or objects installed in the vehicle interior) from a traveling part (chassis) of the vehicle body so as to limit the damping to the vehicle interior, other than damping all of parts above the traveling part (chassis).

In the present embodiment, the damping mechanism unit 2120 has a plurality of damping modes with different vibration suppressing levels, and adaptively switches the damping mode according to a vehicle interior state or the like according to an instruction from the drive system control unit 2100 (or a micro computer 2610). Further, the damping mechanism unit 2120 may change the level of suppressing the vibration in each damping mode, for example, by differentiating areas in which the vibration is suppressed from one another in the vehicle body for each of the damping modes. The performance of suppressing the vibration of the vehicle body is different in each of the damping modes and energy consumption (fuel economy, a consumption amount of a battery, or the like) differs in each of the damping modes. Details on these points will be described below.

The body system control unit 2200 controls operations of various devices equipped in the vehicle body according to various programs. For example, the body system control unit 2200 functions as a control device regarding lock and unlock of a door lock such as a keyless entry system or a smart key system and start and stop of the system 2000, and a control device of a power window device and various lamps (including a head lamp, a back lamp, a brake lamp, a turn signal, and a fog lamp) (including switching control of high beam and low beam of the head lamp as a function). When a radio wave transmitted from a portable transmitter built in a key (or a portable transmitter replacing the key) or a signal of various switches arrives, the body system control unit 2200 controls a door lock device, a power window device, a lamp, or the like of a vehicle (none of them are illustrated in FIG. 1).

The battery control unit 2300 controls a secondary battery that is a power supply source of the drive motor according to various programs. For example, in the battery control unit 2300, a battery device 2310 including the secondary battery measures a battery temperature and a battery output voltage of the secondary battery, a remaining capacity of the battery, and the like, and outputs a measurement result to the battery control unit 2300. The battery control unit 2300 performs arithmetic processing using input information from the battery device 2310, and performs temperature adjustment control of the secondary battery and control of a cooling device (not illustrated) and the like provided in the battery device 2310.

The vehicle exterior information detection unit 2400 detects information outside the vehicle having the vehicle control system 2000 mounted. For example, at least one of an imaging unit 2410 and a vehicle exterior information detection section 2420 is connected to the vehicle exterior information detection unit 2400.

The imaging unit 2410 is a so-called vehicle-mounted camera and images surroundings of the vehicle, and includes at least one of a time of flight (ToF) camera, a stereo camera, a monocular camera, an infrared camera, and another camera.

The vehicle exterior information detection section 2420 includes, for example, at least one of an environmental sensor for detecting a current weather or meteorological phenomenon, an ambient information detection sensor for detecting surrounding vehicles, obstacles, passersby, and the like, and an audio sensor (a microphone that collects an audio generated around the vehicle) (none of them are illustrated). In the case where the vehicle exterior information detection section 2420 is an audio sensor, a sound outside the vehicle caused by an accident or a near miss, such as a horn, a sudden braking, or a collision sound, can be acquired.

The environmental sensor referred to here is, for example, a raindrop sensor for detecting rainy weather, a fog sensor for detecting fog, a sunshine sensor for detecting the degree of sunshine, a snow sensor for detecting snowfall, or the like. Further, the ambient information detection sensor is configured by an ultrasonic sensor, a radar device, a light detection and ranging or laser imaging detection and ranging (LIDAR) device, and the like.

The imaging unit 2410 and the vehicle exterior information detection section 2420 may be configured as independent sensors or devices, respectively, or may be configured as devices in which a plurality of sensors or devices are integrated. Description of details of installation positions of the imaging unit 2410 and the vehicle exterior information detection section 2420 is omitted.

The vehicle exterior information detection unit 2400 causes the imaging unit 2410 to capture an image outside the vehicle, and receives captured image data from the imaging unit 2410. Further, the vehicle exterior information detection unit 2400 receives detection information from the vehicle exterior information detection section 2420. In the case where the vehicle exterior information detection section 2420 is the ultrasonic sensor, the radar device, or the LIDAR device, the vehicle exterior information detection unit 2400 transmits an ultrasonic wave, an electromagnetic wave, or the like, and receives information of a reflected wave from the vehicle exterior information detection section 2420.

The vehicle exterior information detection unit 2400 may perform image recognition processing of recognizing surrounding people, vehicles, and obstacles, road signs (road guidance) installed on a shoulder of a road, road signs drawn on a road surface of a road, and the like, object recognition processing of detecting or recognizing an object outside the vehicle, and distance detection processing of detecting a distance to an object outside the vehicle on the basis of the information received from the vehicle exterior information detection section 2420. Further, the vehicle exterior information detection unit 2400 may perform environment recognition processing of recognizing an ambient environment such as a state of rainfall, fog, or a road surface on the basis of the information received from the vehicle exterior information detection section 2420.

Note that the vehicle exterior information detection unit 2400 may perform processing such as distortion correction or positioning for the image data received from the vehicle exterior information detection section 2420. Further, the vehicle exterior information detection unit 2400 may synthesize image data captured by different imaging units 2410 to generate a bird's-eye image or a panoramic image. Further, the vehicle exterior information detection unit 2400 may perform view conversion processing using the image data captured by different imaging units 2410.

The vehicle interior information detection unit 2500 detects information inside the vehicle. The vehicle interior information detection unit 2500 is connected to, for example, a vehicle interior state detection unit 2510 for detecting a state of a driver who drives the vehicle or another passenger, and detects information of the interior of the vehicle on the basis of state information input from the vehicle interior state detection unit 2510. The driver referred to here means a passenger sitting on a driver's seat in the vehicle or a passenger stored in the integrated control unit 2600 as a person who should drive the vehicle, of passengers in the vehicle.

The vehicle interior state detection unit 2510 may include a vehicle-mounted camera (driver monitor camera) for capturing the interior of the vehicle, a thermo camera, a biosensor for detecting biological information (perspiration, a body temperature, a heartbeat, and the like) of the driver or each passenger, a microphone for collecting an audio in the vehicle, a thermometer and a hygrometer for measuring a temperature and a humidity in the vehicle, an odor sensor, an illuminance sensor, and the like. The vehicle interior state detection unit 2510 can recognize a face included in a captured image of the driver monitor camera and authenticate the face of the passenger. In addition, the vehicle interior state detection unit 2510 can detect a gaze point (or a line-of-sight direction) of the driver or another passenger on the basis of a direction that the recognized face faces and a movement of an eye included in the recognized face. The biosensor is provided on, for example, a seat surface, a steering wheel, or the like, and detects the biological information of the driver sitting on the driver's seat or the driver holding the steering wheel. Further, the microphone can acquire a sound inside the vehicle caused by an accident or a near miss, such as a horn, a sudden braking, or an audio (scream) of the passenger. The vehicle interior information detection unit 2500 may perform signal processing such as noise canceling for an audio signal collected by the microphone. The vehicle interior information detection unit 2500 may modulate the audio other than a specific audio (for example, a voice of the driver or a voice registered in advance) for the purpose of privacy protection and the like.

Further, the vehicle interior state detection unit 2510 may include a load sensor for detecting a load applied to the driver's seat or another seat (a front passenger seat, a rear seat, or the like) (whether a person is seated on the seat) or change of a weight of the vehicle interior. Further, the vehicle interior state detection unit 2510 may detect a state of the driver on the basis of operations on various devices by the driver, such as an accelerator, a brake, a steering wheel, a wiper, a turn signal, an air conditioner, and other switches. Further, the vehicle interior state detection unit 2510 may check a status such as non-possession of a driver's license or refusal of driving of the driver.

In the present embodiment, the drive system control unit 2100 (or the micro computer 2610) adaptively switches the damping mode of the damping mechanism unit 2120 according to the vehicle interior state detected by the vehicle interior state detection unit 2510 or the like. Details on this point will be described below.

The integrated control unit 2600 controls the overall operation in the vehicle control system 2000 according to various programs. In the example illustrated in FIG. 1, the integrated control unit 2600 includes the micro computer 2610, a general-purpose communication interface 2620, a dedicated communication interface 2630, a positioning unit 2640, a beacon receiving unit 2650, an in-vehicle device interface 2660, an audio image output unit 2670, an on-board network interface 2680, and a storage unit 2690. Further, an input unit 2800 is connected to the integrated control unit 2600.

The input unit 2800 is configured by a device that can be operated by the driver or another passenger, such as a touch panel, a button, a microphone, a switch, a lever, and the like. The input unit 2800 may be, for example, a remote control device using an infrared ray or another radio wave, or may be an externally connected device such as a mobile phone, a personal digital assistant (PDA), a smartphone, or a tablet terminal corresponding to the operation of the vehicle control system 2000 (none of them are illustrated). The input unit 2800 may be an audio input by a microphone. The input unit 2800 may be, for example, a camera, and in this case, the passenger can input information to the integrated control unit 2600 by gesture. Further, the input unit 2800 may include, for example, an input control circuit or the like that generates an input signal on the basis of the information input by the passenger using the above input unit 2800 and outputs the input signal to the integrated control unit 2600. The passengers including the driver can input various data and instruct processing operations to the vehicle control system 2000 by operating the input unit 2800.

The storage unit 2690 may include a random access memory (RAM) for storing various programs executed by the micro computer, and an electrically erasable and programmable read only memory (EEPROM) for storing various parameters, a calculation result, a detection value of a sensor, and the like. Further, the storage unit 2690 may include a mass storage device (not illustrated) configured by a magnetic storage device such as a hard disc drive (HDD), a semiconductor storage device such as a solid state drive (SSD), an optical storage device, a magneto-optical storage device, or the like. For example, the mass storage device can be used (as a video recorder) for recording a video of the surroundings of the vehicle or the vehicle interior captured by the imaging unit 2410.

The general-purpose communication interface 2620 is a general-purpose communication interface for mediating communication with various devices existing in the external environment. The general-purpose communication interface 2620 includes a cellular communication protocol of a global system of, for example, mobile communications (GSM) (registered trademark), WiMAX, long term evolution (LTE), or LTE-advanced (LTE-A), a wireless LAN such as Wi-Fi (registered trademark), or another wireless communication protocol such as Bluetooth (registered trademark). The general-purpose communication interface 2620 can be connected to a device (for example, an application server, a control server, or a management server) existing on an external network (for example, the internet, a cloud network, a provider-specific network, or the like) via a base station in the cellular communication, an access point in the wireless LAN, or the like for example. Further, the general-purpose communication interface 2620 may be connected with a terminal existing in the vicinity of the vehicle (for example, an information terminal carried by the driver or a passerby, a store terminal installed in a store adjacent to a road on which the vehicle is traveling, a machine type communication (MTC) terminal (such as a home gas meter or a vending machine) connected to a communication network without human intervention, and the like), using a peer to peer (P2P) technology, for example.

The dedicated communication interface 2630 is a communication interface for supporting the communication protocol established for use in the vehicle. For example, the dedicated communication interface 2630 may include a standard protocol such as a wireless access in vehicle environment (WAVE), which is a combination of a lower layer IEEE 802.11p and an upper layer IEEE 1609, dedicated short range communications (DSRC), or a cellular communication protocol. The dedicated communication interface 2630 typically performs V2X communication that is a concept including one or more of vehicle to vehicle communication, vehicle to infrastructure communication, vehicle to home and vehicle to pedestrian communication.

The positioning unit 2640 receives a global navigation satellite system (GNSS) signal from a GNSS satellite (for example, a global positioning system (GPS) signal from a GPS satellite) to execute positioning, and generates position information including the latitude, longitude, and altitude of the vehicle, for example. Note that the positioning unit 2640 may specify a current position on the basis of electricity measurement information from a wireless access point using PlaceEngine (registered trademark) or the like, or may acquire the position information from a mobile phone having a positioning function, a personal handy-phone system (PHS), or a mobile terminal possessed by a passenger, such as a smart phone.

The beacon receiving unit 2650 receives a radio wave or an electromagnetic wave transmitted from a wireless station or the like installed on a road, for example, and acquires the current position of the vehicle and road traffic information (information on such as congestion, road closure, and required time). Note that the function of the beacon receiving unit 2650 can be mounted in the dedicated communication interface 2630 described above.

The in-vehicle device interface 2660 is a communication interface for mediating connection between the micro computer 2610 and various in-vehicle devices 2760 existing in the vehicle. The in-vehicle device interface 2660 may establish wireless connection using a wireless communication protocol such as a wireless LAN, Bluetooth (registered trademark), near field communication (NFC), or wireless universal serial bus (USB) (WUSB). Further, the in-vehicle device interface 2660 may establish wired connection such as a USB, a high definition multimedia interface (HDMI) (registered trademark), mobile high-definition link (MHL), or the like via a connection terminal (not illustrated) (and a cable if necessary). The in-vehicle device interface 2660 exchanges control signals or data signals with, for example, a mobile device or a wearable device possessed by a passenger, or the in-vehicle device 2760 carried in or attached to the vehicle.

The on-board network interface 2680 is an interface for mediating communication between the micro computer 2610 and the communication network 2010. The on-board network interface 2680 transmits and receives signals and the like according to a predetermined protocol supported by the communication network 2010.

The micro computer 2610 of the integrated control unit 2600 controls the vehicle control system 2000 according to various programs on the basis of information acquired via at least one of the general-purpose communication interface 2620, the dedicated communication interface 2630, the positioning unit 2640, the beacon receiving unit 2650, the in-vehicle device interface 2660, and the on-board network interface 2680.

For example, the micro computer 2610 may calculate a control target value of the drive force generation device, the steering mechanism, or the brake device on the basis of acquired information of the interior and the exterior of the vehicle, and output a control command to the drive system control unit 2100. For example, the micro computer 2610 may perform cooperative control for the purpose of avoiding a collision of the vehicle or alleviating impact, tracking based on the distance between vehicles, vehicle speed maintained traveling, automatic driving, or the like. Further, the micro computer 2610 may instruct the damping mechanism unit 2120 to switch the damping mode according to the interior state detected by the vehicle interior state detection unit 2510, the driving state of the vehicle, the ambient environment, or the like.

Further, the micro computer 2610 may create local map information including peripheral information of the current position of the vehicle on the basis of information acquired via at least one of the general-purpose communication interface 2620, the dedicated communication interface 2630, the positioning unit 2640, the beacon receiving unit 2650, the in-vehicle device interface 2660, and the on-board network interface 2680. Further, the micro computer 2610 may predict danger such as a collision of the vehicle, approach of a passerby, a building, or the like, entry into a road that is closed, on the basis of the acquired information, and generate a warning signal. The warning signal referred to here is, for example, a signal for generating a warning sound or for lighting a warning lamp.

Further, the micro computer 2610 may realize the drive recorder function, using the above-described storage unit 2690 or the like. To be specific, the micro computer 2610 may control recording of the video of the surroundings of the vehicle or the vehicle interior captured by the imaging unit 2410.

The audio image output unit 2670 transmits an output signal of at least one of an audio and an image to an output device that can visually or aurally notify information to a passenger of the vehicle or to the outside of the vehicle. In the case where the output device is a display device, the display device visually displays a result obtained through various types of processing performed by the micro computer 2610 or information received from another control unit, in various formats such as a text, an image, a table, and a graph. Further, in the case where the output device is an audio output device, the audio output device converts an audio signal including reproduced audio data, acoustic data, and the like into an analog signal and aurally outputs the analog signal. In the example illustrated in FIG. 1, as the output device, an audio speaker 2710, a display unit 2720, and an instrument panel 2730 are provided.

The display unit 2720 may include, for example, at least one of an on-board display and a head-up display. The head-up display is a device that displays an image (formed at infinity) in the field of view of the driver, using a windshield. The display unit 2720 may have an augmented reality (AR) display function. In addition to the above, a headphone, a projector, a lamp, or the like may be provided in the vehicle as the output device. Alternatively, the display unit 2720 may be a large screen or a full celestial display that projects a video on a wall surface (including a window) of the vehicle interior.

Further, the instrument panel 2730 is disposed in front of the driver's seat (as well as in front of the front passenger seat), and includes a meter panel indicating information necessary for traveling of the vehicle such as a speed meter, a tachometer, a fuel gauge, a water temperature gauge, and a distance meter, and a navigation system that provides driving guidance to a destination.

Note that at least two control units out of the plurality of control units constituting the vehicle control system 2000 illustrated in FIG. 1 may be physically integrated into one unit. Further, the vehicle control system 2000 may further include a control unit other than those illustrated in FIG. 1. Alternatively, at least one of the control units 2100 to 2600 may be physically configured as an aggregation of two or more units. Further, a part of the functions to be performed by the control units 2100 to 2600 may be realized by another control unit. In short, change of the configuration of the vehicle control system 2000 is permitted as long as the above arithmetic processing realized by transmission and reception of information via the communication network 2010 is configured to be performed by any of the control units. Further, the sensors and devices connected to any of the control units may also be connected to another control unit, and information detected or acquired by a certain sensor or device may be transmitted and received to and from a plurality of communication units via the communication network 2010.

B. Automatic Driving

In the present embodiment, it is assumed that a vehicle under the control of the vehicle control system 2000 can perform automatic driving. The automatic driving can also be defined as a driving mode in which the vehicle autonomously travels to a specified destination while recognizing the ambient environment of the vehicle, using sensing devices such as a radar, a LIDAR, a GPS, and a vehicle-mounted camera. However, the following description does not care about strict definition of the automatic driving. Further, the automatic driving may be limited to and performed on a dedicated driving lane or a lane section for autonomous vehicles set on a highway or a general road. Further, relaxation of regulations related to automatic driving is necessary in addition to improvement of social infrastructure to realize the automatic driving of vehicles. Hereinafter, description will be given on the assumption that these problems are solved and introduction of the automatic driving has been started.

The vehicle interior is desirably a comfortable and relaxed space for the driver who is freed from a driving operation and other passengers during a period in which the vehicle performs the automatic driving. Of course, it is similarly favorable that a vehicle interior of a vehicle in manual driving or a fare-driving vehicle such as a taxi is a comfortable and relaxed space for the passengers.

Regarding the "relaxed space", the vehicle interior can be likened to a living room at home or a favorite place (such as a frequently-used cafe terrace, park, and library) for the passenger. In such a space, the passenger is unlocked from a seatbelt, sometimes sitting on a chair, and sometimes standing. The passenger can read books, operate an information terminal such as a smartphone, view the content such as a movie on a display installed on the vehicle interior, or have conversation or a conference with other passengers with little awareness of being in the vehicle. Further, the passenger is sometimes eating or having a party, where a table is installed in the vehicle interior and a vase, cups, and plates with dishes are placed on the table. Further, in the case where the vehicle is a vehicle like a camper, the passenger is assumed to take a shower, take a sleep, and perform almost all the activities in everyday life in the vehicle interior even during driving of the vehicle.

C. Damping Control of Vehicle Body

C-1. Definition of Damping Mode

To secure a comfortable ride in the vehicle and make the vehicle interior a relaxed space, damping control of the vehicle body is essential. Damping corresponds to controlling a relative position and inclination of an object to be damped such as the vehicle body with respect to a ground plane. From the viewpoint that relaxation can be realized if only the space in which the passenger gets in can be damped, the vehicle interior may be isolated from the traveling part (chassis) so that only the vehicle interior is damped. In addition, damping may be limited to and performed for objects used by the passenger in the vehicle interior (an information terminal such as a smart phone, a table and a chair installed in the vehicle interior, and objects on the table), rather than for the entire vehicle interior.

For example, the damping mechanism unit 2120 is realized by providing a shock absorber in parallel with a spring in a suspension and attenuating a relative motion of upper and lower ends of the spring with the shock absorber. Note that the mechanism of damping itself is arbitrary in the technology disclosed in the present specification. Further, "damping" mentioned below also includes "vibration isolation".

To provide a comfortable ride in either an automatic driving mode or a manual driving mode, the damping control of the vehicle body is important. Note that the damping control is more important under the automatic driving mode than the manual driving because the driver cannot perform the driving operation according to the driving state such as a road surface or a weather.

In the present embodiment, as illustrated in Table 1 below, three types of damping modes: a "damping mode 0 (no damping)", a "damping mode 1", and a "damping mode 2" are defined.

TABLE 1

|  | Damping mode 0 | Damping mode 1 | Damping mode 2 | Stop mode |
|---|---|---|---|---|
| Automatic driving | Normal traveling | Suppressing vibration | Strongly suppressing vibration<br>Low-speed traveling<br>Route selection | Stop |
| Manual driving | Normal traveling | Suppressing vibration | Strongly suppressing vibration | Stop |
| Fare | +¥0 | +¥500/10 km | +¥800/10 km | +¥0 |

In the above Table 1, "suppressing vibration" corresponds to controlling a relative position and inclination with respect to a ground plane. Energy consumption increases to suppress vibration. Therefore, the vehicle interior may be isolated from the traveling part (chassis) and only the vehicle interior may be damped. Further, the energy consumption may be suppressed by limiting and damping objects used by the passenger in the vehicle interior (an information terminal such as a smart phone, a table and a chair installed in the vehicle interior, and objects on the table), rather than the entire vehicle interior.

In the damping mode 0, the damping mechanism unit 2120 performs no damping operation, and the vehicle performs normal traveling (automatic driving or manual driving). In the damping mode 1, the damping mechanism unit 2120 operates the damping operation of the vehicle body. In the damping mode 2, the damping mechanism unit 2120 suppresses vibration stronger than the damping mode 1. In the case of the automatic driving, the vehicle is driven at a lower speed in the damping mode 2. Further, in the damping mode 2, the brake device of the drive system control unit 2100 may be caused to generate braking force of the vehicle so that change of the acceleration of the vehicle body becomes small, or traveling route selection (for example, route selection avoiding curves and slopes) to make change of the acceleration of the vehicle body small may be performed on the basis of the map information.

Although the strict definition of each damping mode is not limited to the above, it should be understood that the level of suppressing vibration becomes high in order of the damping mode 0, the damping mode 1, and the damping mode 2. For example, the level of suppressing vibration may be changed in each damping mode by differentiating areas in which the vibration is suppressed from one another in the vehicle body for each of the damping modes.

Figure 7:
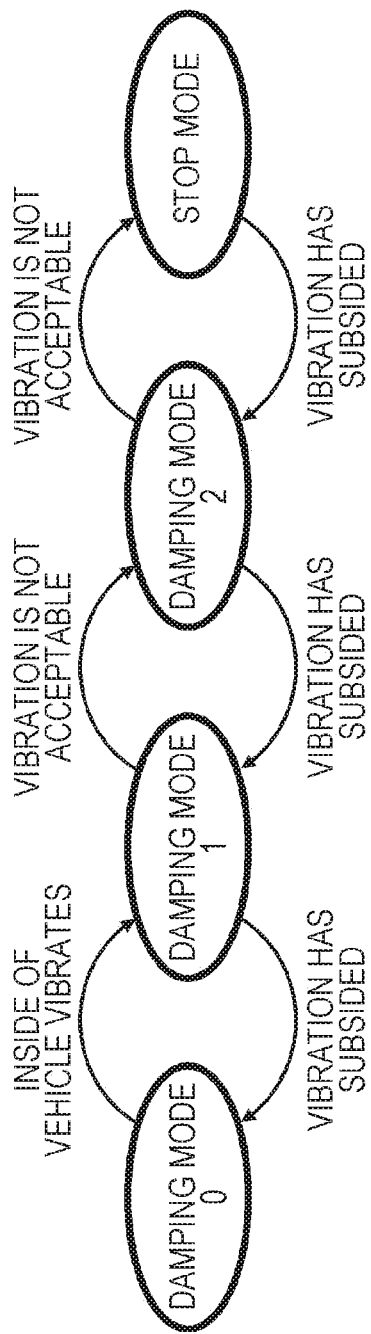
FIG. 7 is a diagram illustrating mode transition of the damping mode.

Further, for a case where making the vehicle interior a relaxed space with a desired comfortable ride is not possible even when the strongest damping mode is applied, a "stop mode", in which the traveling of the vehicle is stopped and the passenger is released from the vibration of the vehicle body giving up continuation of traveling and arrival to the destination, is defined. FIG. 7 illustrates a mode transition diagram. For example, every time an event requiring high-level damping occurs, the mode is transitioned in order of the damping mode 1 and the damping mode 2, and reaches the stop mode when the vehicle cannot withstand the vibration even in the damping mode 2. Meanwhile, when the vibration has subsided and the vehicle can travel again without stopping, or when the comfortable ride can be obtained even in low-level damping, the mode is transitioned in order of the damping mode 2 and the damping mode 1, and is transferred to the damping mode 0 where the damping itself is stopped when the vibration almost disappears or the spirit becomes unnecessary. Note that a damping mode 3, a damping mode 4, and the like, which more strongly suppress the vibration than the damping mode 2, may be defined between the damping mode 2 and the stop mode.

The vehicle is more comfortable to ride, the vehicle interior becomes a more relaxed space, and the satisfaction of the passenger is further improved as the damping mode can more strongly suppress the vibration. However, to more strongly suppress the vibration, the energy consumption increases (in the damping mechanism unit 2120) by that degree of suppression, which leads to a reduction in fuel economy and consumption of the battery, resulting in an increase in cost for traveling.

In the case of a lending-traveling vehicle such as a taxi or a limousine, an additional charge for each damping mode may be set to compensate for the increased cost for damping. In the example illustrated in Table 1, no additional charge in the damping mode 0 and the stop mode where no damping is performed, an additional charge of 500 yen per 10 kilometers in the damping mode 1, and an additional charge of 800 yen per 10 kilometers in the damping mode 2 are respectively set.

C-2. Damping Mode according to State of Vehicle

The vehicle is more comfortable to ride, the vehicle interior becomes a more relaxed space, and the satisfaction of the passenger is further improved as the damping mode can more strongly suppress the vibration. However, to more strongly suppress the vibration, the energy consumption increases (in the damping mechanism unit 2120) by that degree of suppression, which leads to a reduction in fuel economy and consumption of the battery.

When the vehicle is always set to the strongest damping mode, a comfortable ride is always secured but the fuel economy is decreased and the battery is exhausted. Further, if the strong damping mode is set when there is no need for the strong damping because the road surface is good or when the passenger is sitting on the seat with a seat belt fastened, or when there is no need to perform damping because of no passengers (for example, in out of service), the fuel economy is unnecessarily decreased and the battery is unnecessarily consumed. Also, in the case of a lending vehicle, unnecessary additional charge occurs due to unnecessary damping.

Therefore, in the present embodiment, damping control of the vehicle body is performed by adaptively switching the damping mode while considering energy consumption (fuel economy, a consumption amount of a battery, and the like) according to various states of the vehicle such as the state in the vehicle, the driving state of the vehicle, and the ambient environment. That is, the state in the vehicle, the driving state of the vehicle, and the ambient environment are constantly monitored, and the damping mode is switched to a weak damping mode in the case where unnecessity of damping as strong as a current state is determined whereas the damping mode is switched to a strong damping mode in the case where necessity of stronger damping is determined.

The object to be monitored for controlling the damping mode is roughly divided into the state in the vehicle, the driving state of the vehicle, and the ambient environment. Further, examples of the state in the vehicle to be monitored include the state of the passenger, the state of the object in the vehicle, and the state of the in-vehicle device such as the display installed in the vehicle. Hereinafter, a method of controlling the damping mode will be described for each object to be monitored.

(1) Control of Damping Mode According to State in Vehicle

Examples of means for monitoring the state in the vehicle include an in-vehicle camera and a thermo camera included in the vehicle interior state detection unit 2510, a biometric sensor for detecting biological information (perspiration, a body temperature, a heartbeat, and the like) of the passenger, a load sensor for detecting a load applied to the seat or change of the weight of the vehicle interior, a thermometer, a hygrometer, an odor sensor, and an illuminance sensor.

Face recognition is performed for a captured image of the in-vehicle camera, and the number of passengers and individual passengers can be identified, facial expression can be determined, and what kind of object exists in the vehicle can be determined by object recognition. Further, the body temperature of the passenger, and the temperature (for example, whether a liquid is hot) of the object in the vehicle can be determined on the basis of a captured image of the thermo camera. Whether the state provides an uncomfortable feeling to the passenger (or the comfortability is decreased) or not can be determined by comprehensively evaluating the passenger's biological information (perspiration, a body temperature, a heartbeat, and the like), the facial expressions, and an atmosphere in the vehicle (the temperature and humidity). Further, the passenger's eating or drinking in the vehicle can be detected on the basis of a recognition result of the captured image of the in-vehicle camera or a detection result of the odor sensor. Alternatively, the passenger's eating or drinking, or doing other work (for example, playing a game such as chess, assembling a plastic model, or drawing a picture) can be detected on the basis of a detection result of the illumination sensor. Further, the smart phone possessed by the passenger may transmit information of preference of damping to the vehicle side via V2X communication or the like.

Further, in the case where an object in the vehicle is the object to be monitored, object recognition is performed for the captured image of the in-vehicle camera, and installation of an object such as a table and a chair in the vehicle and installation of an object on a device can be detected, and the size (contact area) and weight of the object placed on the device can be further estimated. The load applied to the seat and change of the weight of the vehicle interior can be detected by the load sensor. Further, the brightness and change of shadows in the vehicle can be detected by the illuminance sensor.

Further, in the case where a device such as an in-vehicle display is the object to be monitored, the operation state of the in-vehicle device may be monitored. Further, information regarding, for example, the operation state of the terminal may be acquired from the information terminal operated by the passenger, such as the smart phone.

(1-1) Control of Damping Mode According to State of Passenger

In the case where the vehicle interior is a relaxed space and is used like a living room, various states of the passenger are assumed. It is not always the case that the passenger is seated with a seatbelt fastened, and there may be a case where the passenger is seated but the seat belt is unfastened, lying, standing, the passenger is operating the information terminal such as the smart phone, drinking or eating, uncomfortable or unhealthy (including getting motion sick), or a case where there are many passengers, for example. The level at which the vibration of the vehicle body is accepted (or the level at which damping is required) differs according to the state of the passenger. Further, discomfort may increase and the level at which the vibration of the vehicle body is accepted (or the level at which damping is required) may differ according to the number of passengers. Table 2 illustrates a setting example of the damping mode according to the state of the passenger.

TABLE 2

| State of passenger | Damping mode |
|---|---|
| No specific operation being detected (including there being no passenger) | Damping mode 0 |
| Lying down in a body direction different from a traveling direction | Damping mode 1 |
| Operating a smart phone | Damping mode 1 |
| Standing | Damping mode 2 |
| Wearing no seatbelt | Damping mode 2 |
| Viewing a video on a smart phone | Damping mode 2 |
| Drinking, eating, or doing work in the vehicle | Damping mode 2 |
| Having uncomfortable feeling or being unhealthy (including getting motion sickness) | Damping mode 2 |
| Many passengers | Damping mode 1 |
| Heavy in weight | Damping mode 2 |

Note that, when the passenger is sitting on the chair and doing work or is drinking or eating or doing other work using the table, the damping may be limited to and performed for at least a specific object installed in the vehicle interior, such as the chair or the table. By limiting the object to be damped, the energy consumption can be suppressed as compared with the case of damping all of parts above the traveling part (chassis).

The state of the passenger exemplified in Table 2 corresponds to a condition to trigger switching the damping mode of the vehicle. A correspondence between the state of the passenger and the damping mode may be stored in a database and managed.

(1-2) Control of Damping Mode According to State of Object in Vehicle

In the case where the vehicle interior is a relaxed space and is used like a living room, various objects in the vehicle are assumed. For example, the passenger is assumed to be eating or having a party, where a table is installed in the vehicle and a vase, cups filled with drinks, and plates with dishes are placed on the table. In such a case, if the vehicle body is not appropriately damped, the table may fall down or the objects placed on the table may drop and be damaged. For this reason, the level at which the vibration of the vehicle body is accepted (or the level at which damping is required) differs according to the state of the object in the vehicle. Table 3 illustrates a setting example of the damping mode according to the state of the object in the vehicle.

TABLE 3

| State of object in vehicle | Damping mode |
|---|---|
| There is a valuable item, fragile item, high-temperature liquid (coffee, soup, noodle, or the like), heavy item, item easy to fall down. | Damping mode 2 |
| There is an item filled with a liquid (a cup or a vase filled with water, or the like) on a device (table or desk, or the like) in the vehicle. | Damping mode 1 |
| Items other than the above (including there being no unfixed object in the vehicle) | Damping mode 2 |

Note that, in the case where an object is detected in the vehicle interior, switching of the damping mode may be controlled according to a place where the object is placed. This is because required damping levels differ between the case where the object is placed on the floor of the vehicle interior and the case where the object is placed on the table installed in the vehicle even if the objects are the same. Further, in the case where an object is placed on a device installed in the vehicle such as a table, the damping mode may be determined on the basis of the size (contact area) or weight of the object.

Further, damping may be limited to and performed for at least an object that is hoped to avoid falling down and dropping. By limiting the object to be damped, the energy consumption can be suppressed as compared with the case of damping all of parts above the traveling part (chassis).

The state of the object in the vehicle exemplified in Table 3 corresponds to a condition to trigger switching the damping mode of the vehicle. A correspondence between the state of the object in the vehicle and the damping mode may be stored in a database and managed.

(1-3) Control of Damping Mode According to In-Vehicle Device

In the case where the vehicle interior is a relaxed space and is used like a living room, it is assumed that a display, an audio product, and the like are installed in the vehicle and a content is viewed. The display includes, for example, a small screen display of about 320×180 pixels for receiving one-segment broadcasting, and a large screen or full celestial display that projects a video on a wall surface (including a window) of the vehicle interior.

Although listening to music is unlikely to be affected by the vibration of the vehicle body, the passenger is susceptible to the vibration, such as having motion sickness, when looking at the screen of the display. Further, the degree of being affected by the vibration differs depending on whether the contents displayed on the screen are a still image or a moving image. Whether the reproduced content is a still image or a moving image can be detected on the basis of meta information of the content. Further, in the case of displaying a video captured by the vehicle-mounted camera, not only the screen but also the vehicle mounted camera moves when the vehicle body vibrates, and therefore, the influence of the vibration becomes larger. Table 4 illustrates a setting example of the damping mode according to the state of the in-vehicle display.

TABLE 4

| State of in-vehicle device | Damping mode |
| --- | --- |
| Displaying a still image | Damping mode 1 |
| Displaying a video | Damping mode 1 |
| Displaying a moving picture of on-board camera | Damping mode 2 |

Further, the influence of vibration differs depending on whether the video includes strenuous movement even in the case of viewing moving image content, and therefore the damping mode may be set according to the movement of the moving image.

Note that the damping damping may be limited to and performed for at least the in-vehicle display when the passenger is viewing moving image content. By limiting the object to be damped, the energy consumption can be suppressed as compared with the case of damping all of parts above the traveling part (chassis).

The state of the in-vehicle display exemplified in Table 4 corresponds to a condition to trigger switching the damping mode of the vehicle. A correspondence between the state of the in-vehicle display and the damping mode may be stored in a database and managed.

(2) Control of Damping Mode According to Driving State of Vehicle

An example of means for monitoring the driving state of the vehicle includes the vehicle state detection unit 2110. For example, whether the traveling is high-speed traveling or low-speed traveling can be determined on the basis of a detection result of the engine speed, the rotation speed of a wheel, or the like. Further, whether the vehicle body is swinging or not can be determined on the basis of a detection result of the gyro sensor. Further, whether the vehicle can smoothly travel or not (whether there is a road with many curves, an irregular ground, or the like) may be determined on the basis of the operation amount of the accelerator pedal, the operation amount of the brake pedal, and the steering angle of the steering wheel. The level at which the vibration of the vehicle body is accepted (or the level at which damping is required) differs according to the driving state of the vehicle. Further, the information of the driving state of the driver's own vehicle may be received from the outside such as a surrounding vehicle or a pedestrian that can observe the driver's own vehicle via V2X communication or the like.

In the case of a vehicle used for transportation service like a taxi, whether the taxi is a taxi en route to a customer or a taxi out of service can be determined even in the state of no passengers on the basis of a switch operation of the in-vehicle device 2760 such as a taxi meter. In the case of the taxi en route to a customer, damping of the vehicle body is required to keep setting of the vehicle interior and the like, but damping is not necessary in out of service.

Table 5 illustrates a setting example of the damping mode according to the driving state of the vehicle.

TABLE 5

| Driving state of vehicle | Damping mode |
| --- | --- |
| High-speed traveling | Damping mode 1 |
| Low-speed traveling | Damping mode 0 |
| Uncomfortable driving (many curves, irregular ground, or the like) | Damping mode 2 |
| En route to customer | Damping mode 1 |
| Out of service | Damping mode 0 |

The driving state of the vehicle exemplified in Table 5 corresponds to a condition to trigger switching the damping mode of the vehicle. A correspondence between the driving state of the vehicle and the damping mode may be stored in a database and managed.

(3) Control of Damping Mode According to Ambient Environment

Examples of means for monitoring the ambient environment of the vehicle include the imaging unit 2410 such as the vehicle-mounted camera, and an environmental sensor and an ambient information detection sensor included in the vehicle exterior information detection section 2420. Alternatively, the general-purpose communication interface 2620 may receive information regarding the ambient environment from a server on an external network such as the Internet via V2X communication and the like, rather than the vehicle itself collecting the information of the ambient environment. For example, during a natural disaster such as heavy rain, heavy snowfall, lightning strikes, storms, typhoons, or earthquakes, decrease in the comfortability of the passenger cannot be prevented even in any damping mode. Table 6 illustrates a setting example of the damping mode according to the ambient environment.

TABLE 6

| Ambient environment | Damping mode |
| --- | --- |
| An environment in which a sense of discomfort of a passenger cannot be eliminated by damping when traveling | Stop mode |

The ambient environment exemplified in Table 6 corresponds to a condition to trigger switching the damping mode of the vehicle. A correspondence between the ambient environment and the damping mode may be stored in a database and managed.

C-3. Switching Control of Damping Mode

Figure 2:
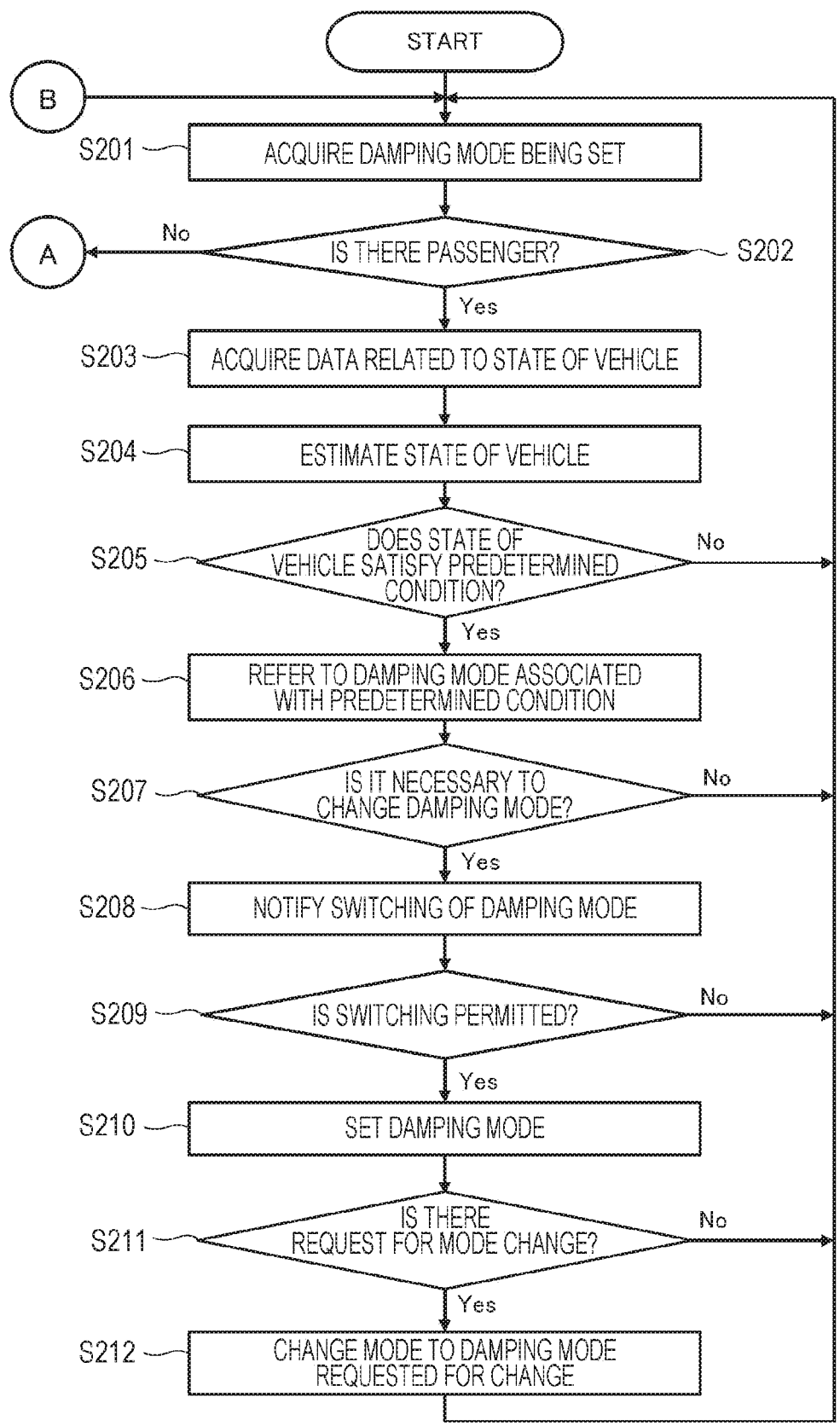
FIG. 2 is a flowchart (first half) illustrating a processing procedure for switching a damping mode according to a state of a vehicle.
Figure 3:
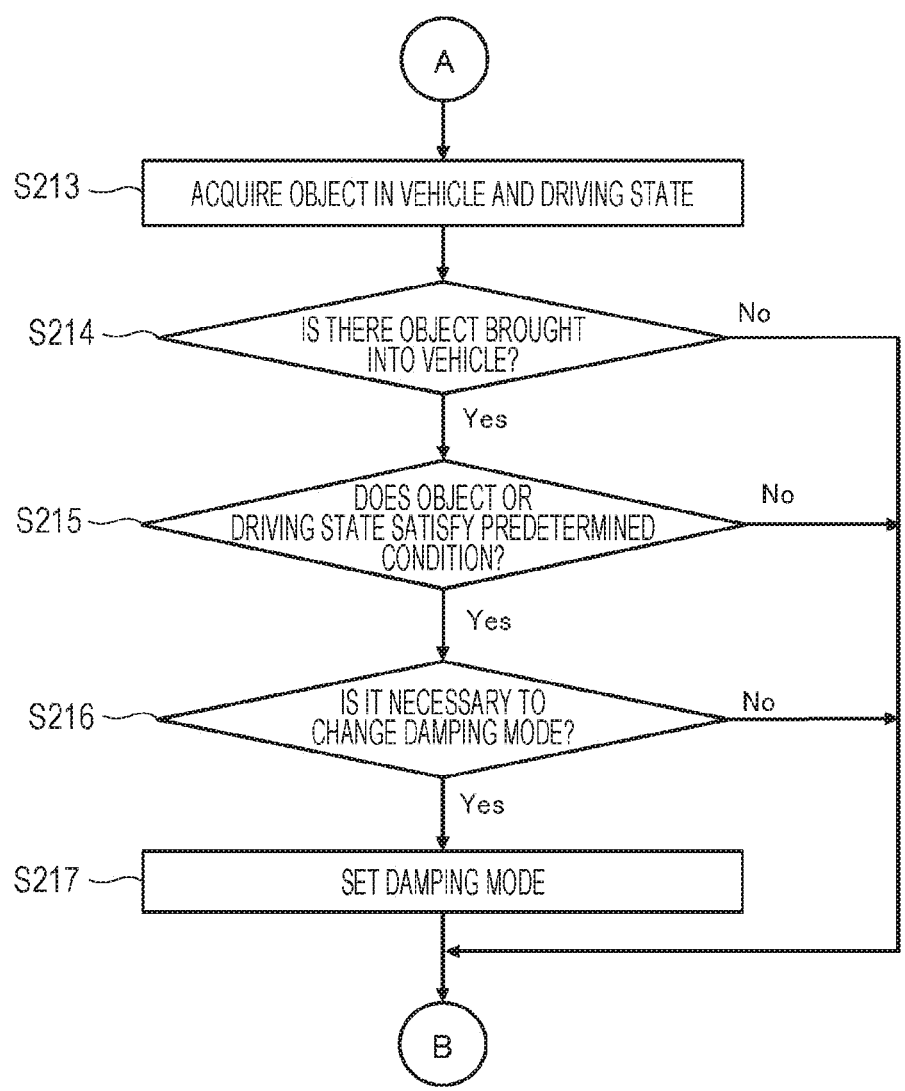
FIG. 3 is a flowchart (second half) illustrating the processing procedure for switching a damping mode according to a state of a vehicle.

FIG. 2 and FIG. 3 illustrate flowcharts illustrating a processing procedure for switching the damping mode according to the state of the vehicle. The processing procedure illustrated in FIG. 2 and FIG. 3 can be realized in the form that the micro computer 2610 executes a predetermined program code, for example, during driving of the vehicle.

First, the damping mode currently set (or performed by the damping mechanism unit 2120) is acquired or confirmed (step S201).

Next, whether there is a passenger in the vehicle interior is checked on the basis of the captured image of the driver monitor camera or change of the weight of the seat or the vehicle interior detected by the load sensor included in the vehicle interior state detection unit 2510 (step S202).

In the case where there is a passenger in the vehicle interior (Yes in step S202), data regarding the state of the vehicle is acquired from the vehicle interior state detection unit 2510, the imaging unit 2410, the vehicle exterior information detection section 2420, the vehicle state detection unit 2110, and the like (step S203). Then, the acquired data is analyzed and the state of the vehicle is estimated (step S204). The state of the vehicle referred to here includes the state of the passenger, the state of the object in the vehicle, the state of the in-vehicle device, the driving state of the vehicle, and the ambient environment of the vehicle.

Next, whether the estimated state of the vehicle satisfies a predetermined condition or not is checked (step S205). The predetermined condition referred to here is a condition in which damping should be performed for the vehicle.

In the case where the state of the vehicle does not satisfy the predetermined condition (No in step S205), the processing returns to step S201 and the above processing is repeated until the state of the vehicle changes. On the other hand, in the case where the state of the vehicle satisfies the predetermined condition (Yes in step S205), the damping mode corresponding to the state of the vehicle is identified (step S206).

The predetermined condition referred to here is a condition to trigger switching the damping mode. The predetermined condition is, for example, conditions regarding the state of the passenger, the state of the object in the vehicle, the in-vehicle device, the driving state of the vehicle, the ambient environment, or the like, illustrated in Table 2 to Table 6. Information regarding the trigger conditions and the damping modes corresponding to the respective conditions may be stored in a databased and managed.

Next, whether change from the currently set damping mode (or from the damping mode acquired in step S201) is necessary is checked (step S207).

The case where change of the damping mode is necessary includes a case where it is better to change the damping mode to a higher-level damping mode to improve the state in the vehicle and the comfortability of the passenger or the like, and a case where it is rather better to change the damping mode to a lower-level damping mode to suppress energy consumption because damping of the vehicle body becomes unnecessary or the vehicle body gets rid of the vibration state.

In the case where change of the damping mode is not necessary (No in step S207), the processing returns to step S201, and the above processing is repeatedly executed until necessity to change the damping mode occurs.

On the other hand, in the case where change of the damping mode is necessary (Yes in step S207), switching of the damping mode is notified to the user (step S208), and whether the user has permitted the switching of the damping mode or not is checked (step S209).

Here, the user to which the switching of the damping mode is notified and from which the permission is obtained is the passenger or the driver of the vehicle that is affected in a comfortable ride. In the case where the vehicle is the fare-driving vehicle such as a taxi, and not only the comfortable ride but also the fare increases/decreases by the switching of the damping mode, permission needs to be obtained from the passenger as the user. In the case of an unmanned driving vehicle, permission may be obtained from a remotely located administrator of the vehicle and the like, instead of the passenger.

Also, since switching to the high-level damping mode leads to the decrease in fuel economy and exhaustion of the battery, switching to the high-level damping mode needs to be notified to the user. Notification of switching of the damping mode is performed, for example, via a graphical user interface (GUI) screen. Of course, similar notification may be performed with an audio message rather than the GUI, and the user may instruct whether to permit the switching of the damping mode or not with an audio input.

Figure 4:
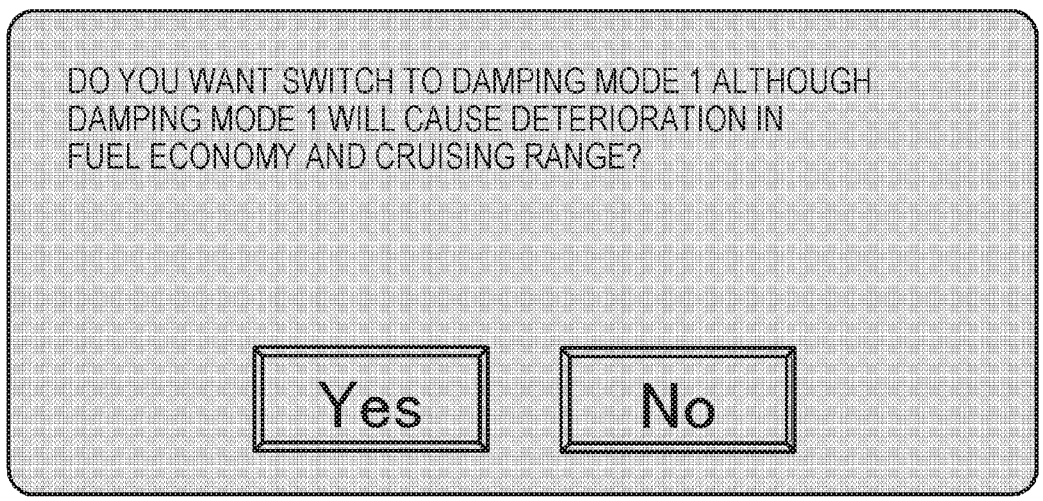
FIG. 4 is a diagram illustrating a configuration example of a GUI screen notifying switching of a damping mode.

FIG. 4 illustrates a configuration example of a GUI screen notifying switching of the damping mode. In the illustrated example, a message "do you want to switch to damping mode 1 although damping mode 1 will cause deterioration in fuel economy and cruising range?" is displayed, and a "Yes" button for permitting the switching of the control mode and a "No" button for rejecting the switching are disposed.

Figure 5:
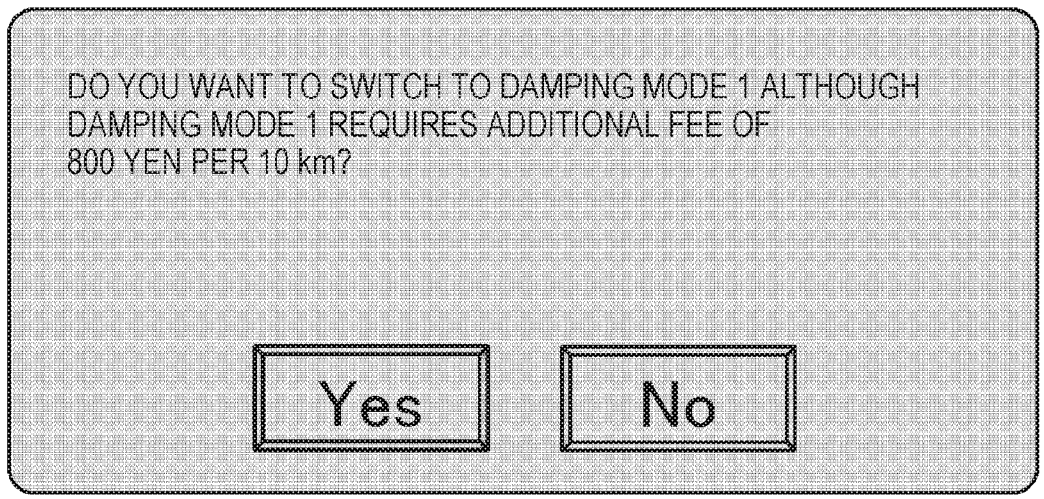
FIG. 5 is a diagram illustrating another configuration example of the GUI screen notifying switching of a damping mode.

Further, FIG. 5 illustrates another configuration example of the GUI screen notifying switching of the damping mode. In the illustrated example, a fare-driving vehicle that charges additional fare according to a control mode is assumed, and a message "do you want to switch to control mode 1 although control mode 1 requires additional fare of 800 yen per 10 km?" is displayed, and a "Yes" button for permitting the switching of the control mode and a "No" button for rejecting the switching are disposed.

In the case where the switching of the damping mode is rejected by, for example, pressing the "No" button on the GUI screen illustrated in FIG. 4 or FIG. 5 (No in step S209), the processing returns to step S201, and the above processing repeatedly executed until change of the damping mode is permitted.

On the other hand, in the case where the switching of the damping mode is permitted by, for example, pressing the "Yes" button on the GUI screen illustrated in FIG. 4 or FIG. 5 (Yes in step S209), the damping mode is set to a permitted damping mode (step S210).

The fact that the vehicle body has been set to the new damping mode may be notified to the user via the GUI screen, for example. Further, there may be a case where the user is not satisfied with the new damping mode, and therefore a request for changing the damping mode may be accepted on the GUI screen. This is because the user sometimes feels that the original low-level damping mode is sufficient although the damping mode is switched to a higher-level damping mode, or the user sometimes wants to switch the damping mode to a higher-level damping mode because the comfortability is not improved, for example. Of course, similar notification may be performed with an audio message rather than the GUI, and the user may instruct change of the damping mode with an audio input.

Figure 6:
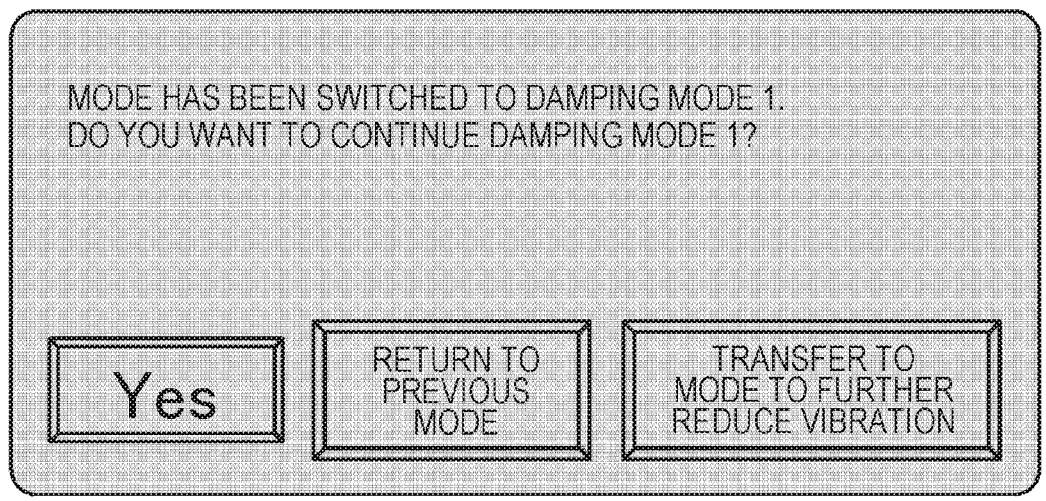
FIG. 6 is a diagram illustrating a configuration example of a GUI screen notifying setting of a damping mode.

FIG. 6 illustrates a configuration example of the GUI screen notifying setting of the damping mode. In the illustrated example, a message "mode has been switched to damping mode 1, do you want to continue damping mode 1?" is displayed, and a "Yes" button for instructing continuation of the control mode, a "return to previous mode" button for instructing return to the original damping mode, and a "transfer to mode to further reduce vibration" button for instructing change to a higher-level damping mode are disposed.

In the case where no change request of the damping mode is made to the damping mode set in step S210 by the user (No in step S211), the processing returns to step S201, and the above processing is repeatedly executed.

On the other hand, in the case where the change request to the damping mode has been accepted from the user (Yes in step S211), the damping mode is changed to the requested damping mode (the original damping mode or a higher (lower)-level damping mode) (step S212). After that, the processing returns to step S201, and the above processing is repeatedly executed.

Note that, when the change request to the damping mode is accepted, the correspondence between the condition that has triggered the switching of the damping mode and the changed damping mode may be stored or learned in step S206. Alternatively, the correspondence between the condition and the damping mode may be stored or learned for each user who has requested the change of the damping mode.

Further, in the case where no passenger in the vehicle interior is determined in step S202 (No in step S202), the data regarding the state of the object in the vehicle and the driving state of the vehicle are acquired from the vehicle interior state detection unit 2510, the vehicle state detection unit 2110, and the like (step S213).

Next, whether there is an object brought into the vehicle or not is checked (step S214). In the case where there is no object brought into the vehicle (No in step S214), the processing returns to step S201 and the above processing is repeatedly executed until the state of the vehicle changes.

In the case where the object brought into the vehicle is detected (Yes in step S214), whether the detected object or the driving state of the vehicle satisfies a predetermined condition or not is checked (step S215). The predetermined condition referred to here is a condition in which damping should be performed for the vehicle.

The driving state of the vehicle referred to here means that the vehicle is a vehicle en route to a customer or a vehicle out of service, for example. In the case of the vehicle en route to a customer, damping of the vehicle body is required to keep the state of the object placed in the vehicle (setting of the vehicle interior and the like). On the other hand, in the case of the vehicle out of service, keeping the state of the object in the vehicle is not necessary, and therefore damping of the vehicle body is also unnecessary.

In the case where the detected object or the driving state of the vehicle does not satisfy the predetermined condition (No in step S215), the processing returns to step S201 and the above processing is repeatedly executed until the state of the vehicle changes. On the other hand, in the case where the detected object or the driving state of the vehicle satisfies the predetermined condition (Yes in step S215), whether change of the damping mode is necessary or not is checked by reference to, for example, above Table 3 and Table 5, or information corresponding to these tables (step S216).

In the case where change of the damping mode is not necessary (No in step S216), the processing returns to step S201, and the above processing is repeatedly executed until necessity to change the damping mode occurs.

On the other hand, in the case where change of the damping mode is necessary (Yes in step S216), the damping mode is changed (step S217). After that, the processing returns to step S201, and the above processing is repeatedly executed.

According to the processing procedures illustrated in FIG. 2 and FIG. 3, the damping control of the vehicle body can be performed by adaptively switching the damping mode while considering energy consumption (fuel economy, a consumption amount of a battery, and the like) according to various states of the vehicle such as the state in the vehicle, the driving state of the vehicle, the ambient environment, and the like.

INDUSTRIAL APPLICABILITY

The technology disclosed in the present specification has been described in detail with reference to the specific embodiments. However, it is obvious that those skilled in the art can make modifications and substitutions of the embodiments without departing from the gist of the technology disclosed in the present specification.

The technology disclosed in the present specification can be applied to various vehicles such as automobiles (including gasoline and diesel vehicles), electric vehicles, hybrid electric vehicles, motorcycles, bicycles, personal mobility, and the like. Furthermore, the technology disclosed in the present specification can also be applied to moving bodies (robots, airplanes, ships, and the like) in forms other than a vehicle traveling on a road.

The damping control device to which the technology disclosed in the present specification is applied can perform damping control for a vehicle body of a vehicle during automatic operation, for example, in an appropriate damping mode while considering energy consumption (such as fuel economy or a consumption amount of a battery) according to a state in the vehicle. However, the damping control device can surely perform similar damping control for a vehicle during manual operation.

In short, the technology disclosed in the present specification has been described in the form of examples, and the contents of description of the present specification should not be restrictively construed. To judge the gist of the technology disclosed in the present specification, the scope of claims should be taken into consideration.

Note that the technology disclosed in the present specification may have the following configurations.

(1) A damping control device including:

a damping mechanism unit configured to damp a moving body by any of a plurality of damping modes having different degrees of suppressing vibration; and a control unit configured to control the damping mode in the damping mechanism unit according to a state of the moving body.

(2) The damping control device according to (1), in which
the plurality of different damping modes has different areas from one another in which the vibration of the moving body is damped.

(3) The damping control device according to (1), further including:
a detection unit configured to detect the state of the moving body including a state of a passenger, in which
the control unit controls switching of the damping mode according to the state of a passenger detected by the detection unit.

(4) The damping control device according to (2), in which
the control unit switches the damping mode to a damping mode of more strongly suppressing vibration in response to detection of existence of food or drink in the moving body by the detection unit.

(5) The damping control device according to (2), in which
the control unit switches the damping mode to a damping mode of more strongly suppressing vibration in response to detection of a decrease in comfortability of the passenger by the detection unit.

(6) The damping control device according to (1), further including:
a detection unit configured to detect the state of the moving body including a state of an object installed in the moving body, in which
the control unit controls switching of the damping mode according to the state of an object detected by the detection unit.

(7) The damping control device according to (6), in which
the control unit controls switching of the damping mode according to a place where the object detected by the detection unit is placed.

(8) The damping control device according to (6), in which
the control unit switches the damping mode to a damping mode of more strongly suppressing vibration in response to detection of placement of an object on a predetermined object installed in the moving body by the detection unit.

(9) The damping control device according to (1), in which
the control unit controls switching of the damping mode according to an operation state of a device installed in the moving body.

(10) The damping control device according to (1), further including:
a detection unit configured to detect a driving state of the moving body, in which
the control unit controls switching of the damping mode according to the driving state detected by the detection unit.

(11) The damping control device according to (1), further including:
a detection unit configured to detect an ambient environment of the moving body, in which
the control unit controls switching of the damping mode according to the ambient environment detected by the detection unit.

(12) The damping control device according to (1), in which
the control unit prompts a user to select whether to switch the damping mode or not.

(13) The damping control device according to (1), in which
the damping mode includes at least one of a mode of causing the moving body to have a slow speed and a mode of stopping the moving body.

(14) The damping control device according to (1), in which
the damping mode includes a mode of selecting a route in which the moving body moves.

(15) The damping control device according to (1), in which the damping mode includes a mode of not performing damping.

(16) The damping control device according to (1), in which energy consumption is different in each of the damping modes.

(17) A damping control method including:
a damping step of damping a moving body by any of a plurality of damping modes having different degrees of suppressing vibration; and
a control step of controlling the damping mode in the damping step according to a state of the moving body.

(18) A moving body including:
a drive unit configured to drive the moving body;
a damping mechanism unit configured to damp the moving body by any of a plurality of damping modes having different degrees of suppressing vibration based on the driving by the drive unit; and
a control unit configured to control the damping mode in the damping mechanism unit according to a state of the moving body.

(19) The damping control device according to (12), in which
the control unit sets the damping mode in response to permission of the switching.

(20) The damping control device according to claim 1), in which
the control unit changes the damping mode in response to a request of change of the damping mode from a user.

(21) The damping control device according to (1), in which
the damping mode includes a mode of stopping the moving body.

(22) The damping control device according to (1), in which
the damping mechanism unit suppresses vibration of only a part of the moving body.

REFERENCE SIGNS LIST

2000 Vehicle control system
2010 Communication network
2100 Drive system control unit
2110 Vehicle state detection unit
2120 Damping mechanism unit
2200 Body system control unit
2300 Battery control unit
2310 Battery device
2400 Vehicle exterior information detection unit
2410 Imaging unit
2420 Vehicle exterior information detection section
2500 Vehicle interior information detection unit
2510 Vehicle interior state detection unit
2600 Integrated control unit
2610 Micro computer
2620 General-purpose communication interface
2630 Dedicated communication interface
2640 Positioning unit
2650 Beacon receiving unit
2660 In-vehicle device interface
2670 Audio image output unit
2680 On-board network interface
2690 Storage unit
2710 Audio speaker
2720 Display unit 2730 Instrument panel
2760 In-vehicle device
2800 Input unit

The invention claimed is:

1. A damping control device, comprising:
a damping mechanism unit configured to damp a moving body based on a damping mode of a plurality of damping modes having a plurality of degrees of suppressing vibration, wherein
each degree of suppressing vibration of the plurality of degrees of suppressing vibration is different,
the plurality of damping modes includes a first damping mode, a second damping mode, and a third damping mode,
the moving body moves slower in the first damping mode than in the third damping mode, and
the moving body stops in the second damping mode; and
a control unit configured to control the damping mode in the damping mechanism unit based on a state of the moving body.

2. The damping control device according to claim 1, wherein
the plurality of damping modes is associated with a plurality of areas of the moving body,
each area of the plurality of areas is different, and vibration of the moving body is damped in the plurality of areas.

3. The damping control device according to claim 1, further comprising
a detection unit configured to detect the state of the moving body, wherein
the state of the moving body includes a state of a passenger, and
the control unit is further configured to control a switching operation of the damping mode based on the state of the passenger.

4. The damping control device according to claim 3, wherein
the detection unit is further configured to detect existence of at least one of food or drink in the moving body,
in the switching operation, the control unit is further configured to switch the damping mode to the first damping mode based on the detection of the existence of the at least one of the food or the drink in the moving body,
the damping mechanism unit is further configured to suppress vibration of the moving body, and
a level of the suppression of the vibration in the first damping mode is higher than a level of the suppression of the vibration in the third damping mode.

5. The damping control device according to claim 3, wherein
the detection unit is further configured to detect a decrease in comfortability of the passenger,
in the switching operation, the control unit is further configured to switch the damping mode to the first damping mode based on the detection of the decrease in the comfortability of the passenger,
the damping mechanism unit is further configured to suppress vibration of the moving body, and
a level of the suppression of the vibration in the first damping mode is higher than a level of the suppression of the vibration in the third damping mode.

6. The damping control device according to claim 1, further comprising
a detection unit configured to detect the state of the moving body, wherein
the state of the moving body includes a state of an object in the moving body, and
the control unit is further configured to control a switching operation of the damping mode based on the state of the object.

7. The damping control device according to claim 6, wherein
the detection unit is further configured to detect a place associated with the object, and
the control unit is further configured to control the switching operation of the damping mode based on the place associated with the object.

8. The damping control device according to claim 6, wherein
the detection unit is further configured to detect placement of the object on a specific object in the moving body,
in the switching operation, the control unit is further configured to switch the damping mode to the first damping mode based on the detection of the placement of the object on the specific object,
the damping mechanism unit is further configured to suppress vibration of the moving body, and
a level of the suppression of the vibration in the first damping mode is higher than a level of the suppression of the vibration in the third damping mode.

9. The damping control device according to claim 1, further comprising
a detection unit configured to detect an operation state of a device in the moving body, wherein
the control unit is further configured to control a switching operation of the damping mode based on the detected operation state of the device in the moving body.

10. The damping control device according to claim 1, further comprising
a detection unit configured to detect a driving state of the moving body, wherein
the control unit is further configured to control a switching operation of the damping mode based on the detected driving state.

11. The damping control device according to claim 1, further comprising
a detection unit configured to detect an ambient environment of the moving body, wherein
the control unit is further configured to control a switching operation of the damping mode based on the detected ambient environment.

12. The damping control device according to claim 1, wherein the control unit is further configured to prompt a user to select a switching operation of the damping mode.

13. The damping control device according to claim 1, wherein
the plurality of damping modes further includes a fourth damping mode, and
the fourth damping mode is associated with selection of a route of the moving body.

14. The damping control device according to claim 1, wherein the moving body moves with no damping in the third damping mode.

15. The damping control device according to claim 1, wherein energy consumption of the moving body is different in each of the plurality of damping modes.

16. A damping control method, comprising:
damping a moving body based on a damping mode of a plurality of damping modes having a plurality of degrees of suppressing vibration, wherein
  each degree of suppressing vibration of the plurality of degrees of suppressing vibration is different,
  the plurality of damping modes includes a first damping mode, a second damping mode, and a third damping mode,
  the moving body moves slower in the first damping mode than in the third damping mode, and
  the moving body stops in the second damping mode; and
controlling the damping mode based on a state of the moving body.

17. A moving body, comprising:
a drive unit configured to drive the moving body;
a damping mechanism unit configured to damp the moving body based on the drive of the moving body and a damping mode of a plurality of damping modes having a plurality of degrees of suppressing vibration, wherein
  each degree of suppressing vibration of the plurality of degrees of suppressing vibration is different,
  the plurality of the damping modes includes a first damping mode, a second damping mode, and a third damping mode,
  in the first damping mode, the drive unit is further configured to drive the moving body with a speed slower than a speed in the third damping mode, and
  in the second damping mode, the drive unit is further configured to stop the moving body; and
a control unit configured to control the damping mode in the damping mechanism unit based on a state of the moving body.

18. A damping control device, comprising:
a damping mechanism unit configured to damp a moving body based on a damping mode of a plurality of damping modes having different degrees of suppressing vibration;
a detection unit configured to detect a state of the moving body, wherein the state of the moving body includes an ambient environment of the moving body; and
a control unit configured to:
  control the damping mode in the damping mechanism unit based on the state of the moving body; and
  control a switching operation of the damping mode based on the ambient environment of the moving body.

* * * * *